March 18, 1958     J. A. BECKER ET AL     2,827,257
GAS VALVE FOR HIGH VACUUM SYSTEM
Filed July 16, 1954

INVENTORS J. A. BECKER
R. G. BRANDES
BY
H. O. Wright
ATTORNEY

2,827,257

GAS VALVE FOR HIGH VACUUM SYSTEM

Joseph A. Becker, Summit, and Raymond G. Brandes, Meyersville, N. J., assignors to Bell Telephone Laboratories, Incorporated, New York, N. Y., a corporation of New York Application July 16, 1954, Serial No. 443,832

8 Claims. (Cl. 251—9)

The present invention relates to gas valves for use in high vacuum systems.

In certain types of experimental and commercial operations involving high vacua, it is often necessary to introduce small, controllable amounts of highly purified gases into an evacuated chamber without a corresponding introduction of impurities. The various types of prior art valves tried for this purpose have not been found fully satisfactory, because of limitations imposed by design and material.

Many of the prior art valves are fairly expensive to build, cannot be adjusted readily to maintain a low enough leak rate, or cannot be adjusted rapidly to a new leak rate. Certain types, such as the bent tube leak, which include a long constricted section, are characterized by an undesirable time lag while the trapped gas is adjusted to a different rate of flow. Moreover, valves which rely on the manipulation of a mercury column to control the leak rate through an orifice have been found particularly objectionable in any system requiring high purity of gases, since mercury dissolves gases and slowly gives them off into the vacuum. In addition, most prior art valves do not readily form gas-tight seals with other parts of the system, and cannot be heated to expel occluded gases.

Accordingly, it is a general object of the present invention to devise a simple structure of improved operation for controlling the flow of small amounts of purified gas in high vacuum systems.

A more particular object of the invention is to facilitate rapid and accurate adjustment from one leak rate to another in a high vacuum valve operative over the range $10^{-11}$ to $10^{-6}$ liters per second.

Additional objects of the invention are to provide a valve characterized as above which readily forms vacuum-tight seals with connected elements of the system, and which is adapted for repeated baking to dispel occluded gases.

These and other objects are attained in accordance with the present invention in a valve suitable for incorporation in high vacuum systems, which comprises a short length of metal tubing, highly deflectable in response to pressure, and having a high elastic limit. This is mounted between the abutting central portions of a pair of steel jaws designed, upon closure, to constrict a narrow portion of the tubing walls into gas-tight contact. The jaws are formed with extended shoulder portions which are bruoght to bear in contact with those portions of the tube immediately adjacent the constricted portion deforming the tubing for some length either side of the region of gas-tight contact, thereby creating a reservoir of elastic strain energy which is called upon to force open the constricted portion when the jaws are relaxed.

In preferred form, the tubing comprises an alloy manufactured by the Westinghouse Electric Corporation, and distributed by the Stupakoff Ceramic and Manufacturing Company of Latrobe, Pennsylvania, under the trade name of "Kovar." This name relates to an iron-nickel-cobalt alloy of the general composition defined in Patent 1,942,260, to Howard Scott, January 2, 1934.

A particular feature of a high vacuum valve comprising Kovar, or an equivalent metal tubing, constructed and mounted in the manner described in detail hereinafter, is that the tubing is readily conformable, but highly elastic, so that the leak rate, which is adjustable over a wide range of values, can be changed in less than a second without an appreciable gas-evolution lag.

Advantages to be derived from the use of Kovar tubing, or the like, are that the coefficient of expansion closely approximates that of glass, enabling vacuum-tight seals to be formed with glass tubing connected to other parts of the system. Further, such a device can be heated to a high temperature without becoming soft or distorted in form, and, hence, is adaptable for repeated baking for the expulsion of occluded gases which would otherwise contaminate the intake of the vacuum chamber.

These, and other objects, features and advantages of the present invention, will be apparent from a study of the more detailed specification hereinafter, and the illustrative drawings in which.

Figure 1A:
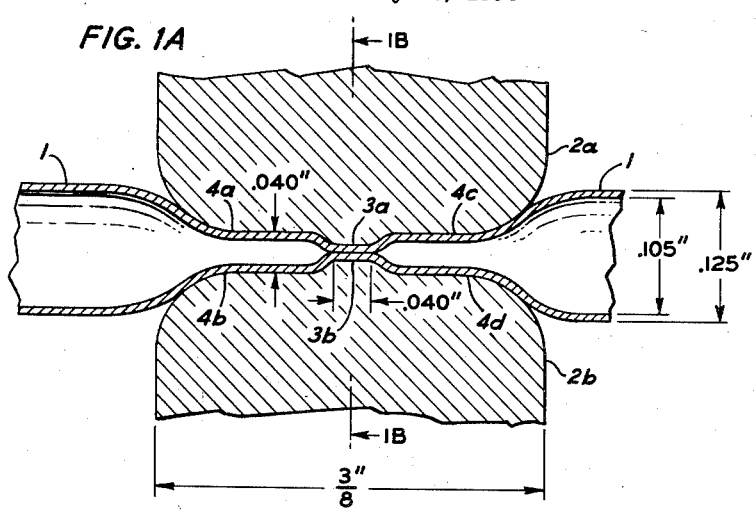
Fig. 1A shows a cross-sectional view of a preferred embodiment of the invention along a vertical plane parallel to the longitudinal axis of the constricted tube.
Figure 1B:
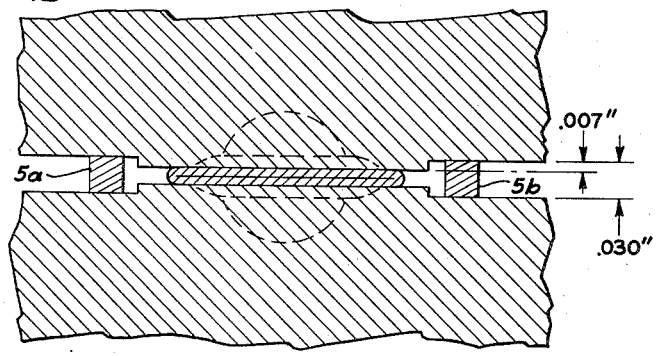
Fig. 1B shows a second cross-sectional view of the same structure, in a vertical plane along the line 1B—1B normal to the plane of Fig. 1A.

Referring in detail to Figs. 1A and 1B of the drawings, a length of tubing 1 having a nominal outer diameter of 0.125 inch, and a nominal inner diameter of 0.105 inch, is constricted between abutting portions of a pair of steel jaws 2a, 2b.

As stated hereinbefore, the tubing may comprise, in preferred form, an alloy designated by the trade name "Kovar," of the general class of alloys described in detail in Patent 1,942,260. A specific "Kovar" is more particularly described in Bulletin 145, entitled "Sealing Glass to Kovar" published by the Stupakoff Ceramic and Manufacturing Company, Latrobe, Pennsylvania.

Other metals may also be suitable for the tubing 1, providing they have certain minimum physical characteristics. These include an elastic limit in excess of, say, 10,000 pounds per square inch, to provide sufficient springiness to enable the walls of the tube to separate to a controllable degree when the constricting force is reduced or removed; and sufficient malleability to prevent cracking in the constricted portion. Moreover, the selected metal should not tarnish or oxidize to such an extent that it would interfere with the sealing action when the tube is compressed. Another important characteristic of the selected metal is that it have a melting point well above 450 degrees or 500 degrees centigrade, to prevent softening or distortion when the tube is baked to remove occluded impurities. A further desirable characteristic is that the metal of the tube have a coefficient of expansion approximating that of a suitable commercial glass, to permit the formation of gas-tight seals with connecting elements of the system.

In constructing the valve, it is important that the inside of the tubing should be physically smooth and chemically clean. The ends of the tubing 1 are united in a gas-tight seal to connecting glass tubing in the manner described, for example, in Patent 2,062,335 to Howard Scott, December 1, 1936. This is possible because the coefficient of expansion of Kovar closely approximates that of Pyrex glass, or certain commercial glasses which are suitable for connecting tubes.

The jaws 2a, 2b preferably comprise a pair of steel blocks including abutting central portions 3a, 3b and extended paired shoulder portions 4a, 4b, and 4c, 4d. In preferred form, each of the shoulder portions is slightly indented from the central portions and is extended in the direction of the principal axis of the tube 1 to at least about twice the extent of the central portions. That portion of the tubing between the abutting jaws 2a, 2b can be thought of as made up longitudinally of a plurality of thin metal springs each of which is shaped somewhat like a tuning fork, the prongs of which spread apart at the outer ends and the inner ends of which are held together between abutting jaws 3a, 3b.

When the constricting jaws are slightly relaxed the restoring forces in these "springs" tend to force apart the inner ends of the springs which are in contact with the abutting portions.

In the preferred embodiment, the jaws 2a and 2b have an overall cross-sectional dimension of three-eighths of an inch in the direction of the longitudinal axis of the tube 1, and the centered abutting portions 3a and 3b have matching cross-sectional dimensions of 0.04 inch in the same direction. Each of shoulder portions 4a, 4b, and 4c, 4d is slightly indented from the corresponding one of central abutting portions 3a and 3b in a direction normal to the major axis of the tube, so that when the jaws 2a and 2b are completely closed, the respective midpoints of the respective shoulder pairs 4a, 4b, and 4c, 4d are separated by about 0.04 inch, curving outward to a larger separation at their respective ends, which approaches the normal outer diameter of the tube 1.

In the plane of Fig. 1B, which is a section taken along the line 1B—1B of Fig. 1A, shims 5a and 5b, each having a rectangular cross-section of 0.30 inch on the side, may be inserted on opposite sides of the constricted portion to prevent the tubing from being constricted too much.

As stated, the function of the broad shoulder portions on either side of the constriction is to bear on the portions of the tube there adjacent, to provide a spring-like action which tends to open the constriction when the force on the jaws is decreased, and thus to achieve a large range of leak rates. The area of the constricted region is purposely made small in order to permit rapid changes in the leak rate, and to prevent delays in pressure changes due to confined gases. The small area of constriction permits sufficient pressures to be achieved with small forces to produce cold flow between the inner walls of the tube at the point of contact. Hence, when the valve is closed, the walls of the tubing are preferably compressed about twenty percent to form a gas-tight junction.

Figure 2:
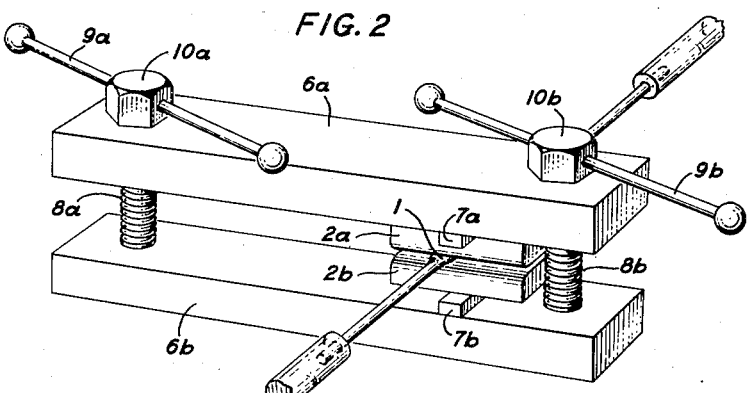
Fig. 2 shows in perspective the complete valve assemblage mounted in a screw and lever device to facilitate operation.

The assemblage shown in Figs. 1A and 1B is preferably mounted on a screw and lever device such as that indicated in Fig. 2, to permit the desired control of the leak rate.

The screw and lever mounting comprises a pair of elongated rectangular blocks 6a and 6b, one above the other, sandwiched between which, considerably closer to one end than to the other, is the valve. The steel jaws 2a and 2b are located to engage the valve between them. A pair of smaller blocks 7a and 7b are respectively interposed between the large blocks 6a and 6b and jaws 2a and 2b. These are respectively aligned above and below the valve portion of the tube, along its principal axis and accordingly function to localize the pressure. The two end sections of the large rectangular blocks 6a and 6b are held together by screws 8a and 8b, which are symmetrically mounted near each of the ends. The screws 8a and 8b are moved in and out to control the spacing between blocks 6a and 6b, and hence, the pressure on the steel jaws 2a and 2b, by means of levers 9a and 9b respectively, attached to the corresponding screw heads 10a and 10b. It will be apparent that large changes in the opening of the valve are controlled by the lever 9b, and refined changes, by the lever 9a.

Valves constructed in the manner described, but without the shims 5a and 5b, were tried out experimentally for six months. During this period they were operated hundreds of times, and baked out at least twenty times, without serious deterioration. Experiments have shown that the rate of fluid flow through the valves when closed is about $10^{-11}$ liters per second, and when opened completely, about $10^{-5}$ liters per second. Rates of fluid flow between the completely open and completely closed conditions can be reached quickly by changing the force on the jaws. The leak rate L in molecules/sec. is related to the rate of fluid flow S by the following equation.

$$L = KS(p_1 - p_2) \qquad (1)$$

where $K = 3.2 \times 10^{19}$ molecules per liter at a pressure of 1 millimeter of mercury, and a temperature of 300 degrees K., and $p_1$ and $p_2$ represent the pressures in millimeter of mercury on the high and low pressure sides of the valve. Usually, $p_2$ is negligible compared to $p_1$.

To appreciate the significance of a valve having a rate of fluid flow S of $10^{-11}$ liters per second, let us compute L for $p_1 = 10$ millimeters and $p_2$ about $10^{-7}$ millimeters. The result is $L = 3.2 \times 10^{+9}$ molecules per second. This leak rate would increase the pressure in a volume of 1 liter at the rate of $10^{-10}$ millimeters per second. If the pressure in the 1 liter volume were measured with an ion gauge having a pump speed $S_g$ of .04 liter per second, the pressure would rise only to $2.5 \times 10^{-9}$ millimeters. Such a low leak rate is comparable with the evaporation rate of nitrogen from the glass walls of a well baked vacuum system. Hence the valve is as tight as need be for experiments in a good vacuum.

It will be apparent to those skilled in the art that principles of the present invention may be embodied in other forms which are the equivalent in structure and function to that disclosed herein by way of illustration.

What is claimed is:

1. A gas valve for high vacuum systems which comprises in combination a metal tube, highly deflectable in response to applied pressure, and highly elastic, a pair of metallic jaws disposed in clamping relation to said tube, said jaws having matched abutting central portions immediately adjacent diametrically opposite sides of said tube, compressing means adapted to exert a maximum pressure on said jaws sufficient to constrict the inner walls of said tube into highly gas-tight contacting relation, and means including shoulder portions slightly indented from the central portions of said jaws and extending therefrom along said tube to at least about twice the extent of said central portions, said shoulder portions shaped to contact and impress in the portions of said tube adjacent said abutting central portions elastic strains which in response to relaxation of said maximum pressure exert a component of stress outward from the axis, to force said abutting portions further apart to a degree of opening controllable by said compressing means.

2. A high vacuum gas valve in accordance with claim 1 wherein said matched abutting central portions have an extent along said tube which is less than the radius of said tube.

3. A gas valve for high vacuum systems which comprises in combination a metal tube, highly deflectable in response to applied pressure, and highly elastic, a pair of metallic jaws disposed in clamping relation to said tube, said jaws having matched abutting central portions immediately adjacent diametrically opposite sides of said tube, wherein said matched abutting central portions have an extent along said tube which is less than the radius of said tube, compressing means adapted to exert a maximum pressure on said jaws sufficient to constrict the inner walls of said tube into highly gas-tight contacting relation, and means including shoulder portions slightly indented from the central portions of said jaws and extending therefrom along said tube to at least about twice the extent of said central portions, in which the separations between said matched shoulder portions, at respective pairs of points midway between the center and edge of said jaws along said tube approximate the extent of said abutting central portions along said tube when said abutting central portions are in contact, whereby strains are impressed in the walls of said tube which strains generate stresses to force said walls apart to a degree of opening controllable by the release of said compressing means.

4. A high vacuum gas valve in accordance with claim 3 in which the metal of said tube has a melting point well above 500 degrees centigrade.

5. A high vacuum gas valve in accordance with claim 3 in which the metal of said tube will not oxidize appreciably when heated in air to at least 500 degrees centigrade.

6. A high vacuum gas valve in accordance with claim 3 in which the metal of said tube has a coefficient of expansion which approximates that of glass.

7. A high vacuum gas valve in accordance with claim 3 in which the metal of said tube comprises an alloy containing nickel and cobalt in a sum of about 43 to 55 percent, with cobalt at least 12 percent and nickel at least 15 percent, and the balance substantially iron.

8. A high vacuum gas valve in accordance with claim 3 wherein the metal of said tube comprises an alloy consisting of 17 percent cobalt, 29 percent nickel, 0.3 percent manganese, and the balance substantially iron, and wherein the metal of the jaws comprises a principal component of steel.

References Cited in the file of this patent

UNITED STATES PATENTS

| | | | |
|---|---|---|---|
| 788,603 | Rowell | | May 2, 1905 |
| 1,024,876 | Barbour | | Apr. 30, 1912 |
| 1,942,260 | Scott | | Jan. 2, 1934 |
| 2,062,335 | Scott | | Dec. 1, 1936 |
| 2,586,984 | Nier | | Feb. 26, 1952 |
| 2,594,794 | Mull | | Apr. 29, 1952 |

FOREIGN PATENTS

| | | |
|---|---|---|
| 22,032 | Austria | 1905 |

OTHER REFERENCES

"Metals Handbook," 1948 Edition (TA-472-.A3), pp. 601-605. (Copy in Scientific Library.)